(12) United States Patent
Kondo

(10) Patent No.: US 6,181,948 B1
(45) Date of Patent: Jan. 30, 2001

(54) RADIO BASE STATION RECEIVING DATA TRANSMISSION SYSTEM FOR UPLINK SITE DIVERSITY OF MOBILE COMMUNICATION SYSTEM

(75) Inventor: Takayuki Kondo, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/104,998

(22) Filed: Jun. 26, 1998

(30) Foreign Application Priority Data

Jun. 30, 1997 (JP) .................................................. 9-174044

(51) Int. Cl.$^7$ ...................................................... H04Q 7/20
(52) U.S. Cl. ........................ 455/517; 455/422; 455/525; 455/560; 455/445
(58) Field of Search ..................................... 455/524, 525, 455/560, 561, 445, 442, 11.1, 132, 133, 134, 135, 422

(56) References Cited

U.S. PATENT DOCUMENTS

| | | | |
|---|---|---|---|
| 4,395,768 | * | 7/1983 | Goethals et al. ...................... 714/788 |
| 5,574,983 | * | 11/1996 | Douzono et al. ................. 455/524 X |
| 5,729,536 | * | 3/1998 | Doshi et al. .......................... 370/328 |
| 5,809,430 | * | 9/1998 | D'Amico .............................. 455/525 |
| 5,867,791 | * | 2/1999 | Chambert ............................. 455/525 |
| 5,896,397 | * | 4/1999 | Tolhuizen ........................... 370/21.2 |
| 5,896,570 | * | 4/1999 | Saunders et al. ................. 455/525 X |

FOREIGN PATENT DOCUMENTS

| | | |
|---|---|---|
| 57-170633 | 10/1982 | (JP) . |
| 64-77332 | 3/1989 | (JP) . |
| 3-50921 | 3/1991 | (JP) . |
| 3-255733 | 11/1991 | (JP) . |
| 5-29993 | 2/1993 | (JP) . |
| 5-145457 | 6/1993 | (JP) . |
| 7-107033 | 4/1995 | (JP) . |
| 8-116313 | 5/1996 | (JP) . |

OTHER PUBLICATIONS

Andrew J. Viterbi, "CDMA Principles of Spread Spectrum Communication".

* cited by examiner

*Primary Examiner*—Thanh Cong Le
*Assistant Examiner*—Yemane Woldetatios
(74) *Attorney, Agent, or Firm*—McGuireWoods, LLP

(57) ABSTRACT

A radio base station receiving data transmission system is provided for uplink site diversity of a mobile communication system that is configured by a mobile station, radio base stations, a base station control device and a mobile communication exchange. Herein, the mobile station establishes the uplink site diversity using the radio base stations under control of the base station control device. Now, each of the radio base stations that are connected to the mobile station to receive its signals performs error detection on receiving data thereof so as to produce error information with respect to each frame. The error information contains error detection information representing occurrence of error in the receiving data and an error frequency representing a degree of error contained in the receiving data. Firstly, the base station control device receives the error information from each of the radio base stations regarding the uplink site diversity. On the basis of the error information, the device detects a radio base station that firstly reports non-error detection result within the radio base stations, or the device selects a radio base station whose amount of error in receiving data is the smallest within the radio base stations. Thus, the device requests such a radio base station to transmit its receiving data thereto. So, the receiving data are further transmitted from the base station control device to the mobile communication exchange.

12 Claims, 8 Drawing Sheets

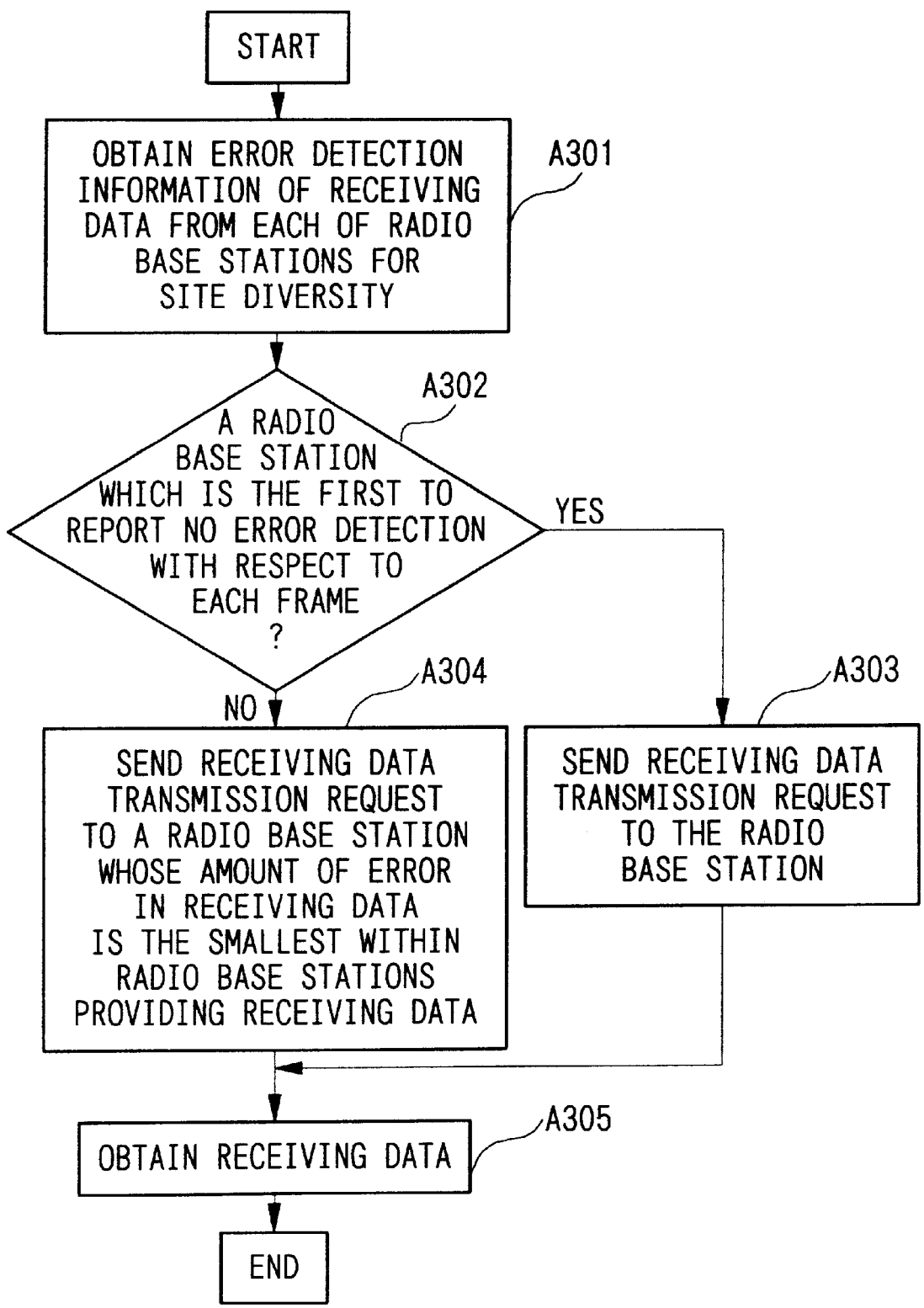

RADIO BASE STATION RECEIVING DATA TRANSMISSION SYSTEM FOR UPLINK SITE DIVERSITY OF MOBILE COMMUNICATION SYSTEM

BACKGROUND OF THE INVENTION

1. Field of the Invention

This invention relates to radio base station receiving data transmission systems provided for uplink site diversity of mobile communication systems. This application is based on patent application No. Hei 9-174044 filed in Japan, the content of which is incorporated herein by reference.

2. Description of the Related Art

Conventionally, one kind of site diversity receiving method is disclosed by the paper of Japanese Patent Application, Publication No. Hei 7-107033, for example. This method is used for improvements of the communication quality, which is realized such that the same signal from a mobile station is received by multiple base stations rather than by a single base station.

FIG. 8 shows an example of a network configuration according to the conventional site diversity receiving method.

In FIG. 8, a mobile station 130 is placed in communicating states with multiple base stations 230-1 to 230-L. Signals received by the base stations are subjected to selection and composition at a diversity composition node 220, an output of which is forwarded to a mobile communication network 210 and is then sent to a network 200 such as PSTN (an abbreviation for "Public Switched Telephone Network") or ISDN (an abbreviation for "Integrated Service Digital Network").

FIG. 9 shows an example of a frame format used between a radio base station and a base station control device in accordance with the conventional method.

In the case of the site diversity that performs communication using three radio base stations, it is necessary to provide three lines of a frame format 400, which consists of a frame number, error detection information, error frequency and receiving data. Herein, 335 bits are provided for one line, so it is necessary to provide a capability of transmitting 1,005 bits for three lines.

The aforementioned conventional technology suffers from the following problem.

In the site diversity, receiving data are transferred from the multiple radio base stations to the base station control device, wherein a diversity effect is obtained by selecting error-free data in the receiving data. In order to perform transfer of the receiving data from the multiple radio base stations to the base station control device, it is necessary to provide a number of lines, which corresponds to a number of radio base stations that are used to establish the site diversity between the radio base stations and base station control device. In the case of the uplink site diversity using three radio base stations, it is necessary to provide three lines, for example.

Because, each radio base station does not evaluate quality of the receiving data thereof, so it merely transmits correct receiving data as well as wrong receiving data to the base station control device.

SUMMARY OF THE INVENTION

It is an object of the invention to provide a radio base station receiving data transmission system which is capable of establishing uplink site diversity of a mobile communication system with a reduced number of lines.

A radio base station receiving data transmission system is provided for uplink site diversity of a mobile communication system that is configured by a mobile station, radio base stations, a base station control device and a mobile communication exchange. Herein, the mobile station establishes the uplink site diversity using the radio base stations under control of the base station control device.

Now, each of the radio base stations that are connected to the mobile station to receive its signals performs error detection on receiving data thereof so as to produce error information with respect to each frame. The error information contains error detection information representing occurrence of error in the receiving data and an error frequency representing a degree of error contained in the receiving data. Firstly, the base station control device receives the error information from each of the radio base stations regarding the uplink site diversity. On the basis of the error information, the device detects a radio base station that firstly reports non-error detection result within the radio base stations, or the device selects a radio base station whose amount of error in receiving data is the smallest within the radio base stations. Thus, the device requests such a radio base station to transmit its receiving data thereto. So, the receiving data are further transmitted from the base station control device to the mobile communication exchange.

Because of the above, it is possible to reduce a number of lines that are required between the radio base station and base station control device, for example. In addition, it is possible to reduce a total amount of communications required to perform the uplink site diversity.

BRIEF DESCRIPTION OF THE DRAWINGS

These and other objects of the subject invention will become more fully apparent as the following description is read in light of the attached drawings wherein:

FIG. 4 is a flowchart showing procedures that the base station control device performs;

DESCRIPTION OF THE PREFERRED EMBODIMENT

Figure 1:
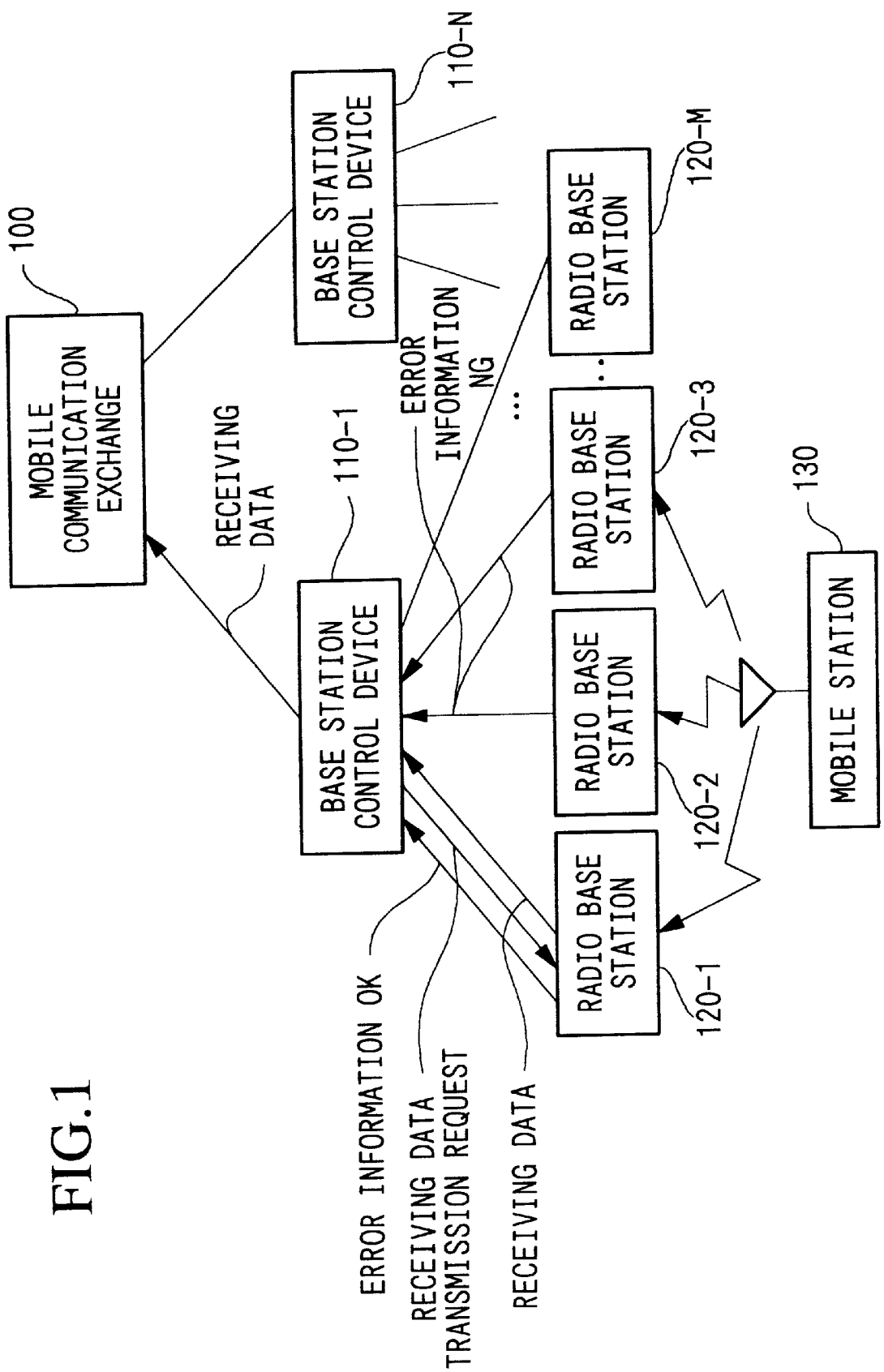
FIG. 1 shows a system configuration of a mobile communication system in accordance with a first example of the invention.

FIG. 1 shows a system configuration of a mobile communication system in accordance with a first example of the invention.

The mobile communication system of FIG. 1 contains a mobile communication exchange 100, base station control devices 110, radio base stations 120 and a mobile station 130. Herein, the mobile communication exchange 100 provides connections with other communication networks such as the PSTN (not shown). The mobile communication exchange 100 is capable of communicating with the base station control devices 110-1 to 110-N, wherein the base station control device 110-1 is capable of communicating with the radio base stations 120-1 to 120-M, each of which is further capable of communicating with the mobile station 130.

Figure 2:
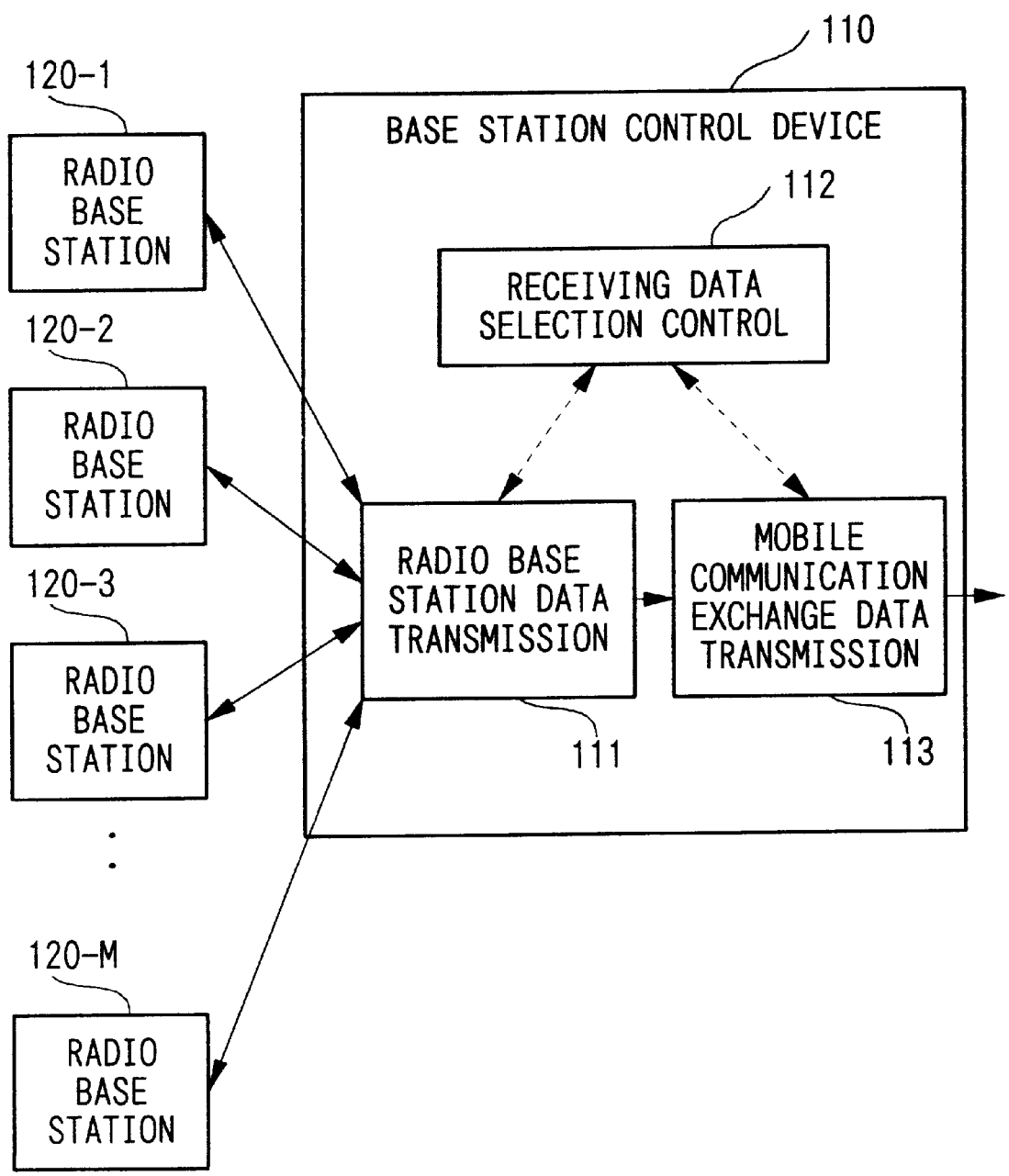
FIG. 2 is a block diagram showing an example of an internal configuration of a base station control device connected with radio base stations.

FIG. 2 shows an example of an internal configuration of the base station control device 110, which is provided in connection with the radio base stations 120-1 to 120-M.

The base station control device 110 is configured by a radio base station data transmission unit 111, a receiving data selection control unit 112 and a mobile communication exchange data transmission unit 113.

The radio base station data transmission unit 111 performs receiving of control information and receiving data as well as transmission of control information with respect to the radio base station 120 connected thereto.

Based on error detection information contained in the control information given from each of the connected radio base stations, the receiving data selection control unit 112 selects a radio base station providing receiving data thereto, which have no error or which have small error. So, the receiving data selection control unit 112 transmits a receiving data transmission request to the selected radio base station via the radio base station data transmission unit 111.

Thus, the radio base station that receives the receiving data transmission request transmits receiving data, which are received by the radio base station data transmission unit 111. So, the mobile communication exchange data transmission unit 113 transmits the receiving data to the mobile communication exchange 100.

Figure 3:
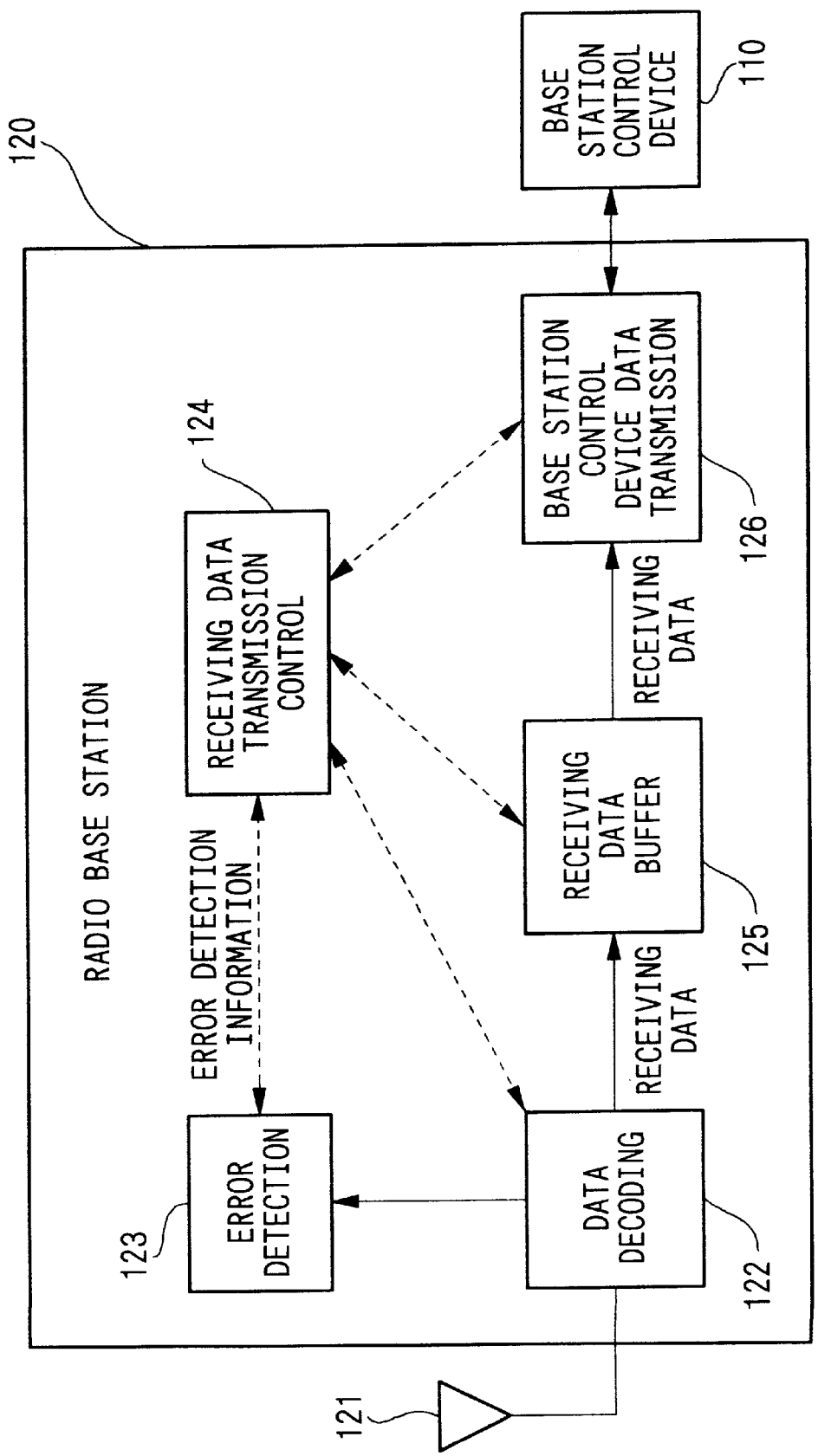
FIG. 3 is a block diagram showing an example of an internal configuration of a radio base station.

FIG. 3 shows an example of an internal configuration of the radio base station 120.

The radio base station 120 is configured by an antenna 121, a data decoding block 122, an error detection block 123, a receiving data transmission control block 124, a receiving data buffer block 125 and a base station control device data transmission block 126.

The antenna 121 receives signals sent from the mobile station.

The data decoding block 122 decodes the signals to produce receiving data.

The error detection block 123 makes a decision as to whether error is contained in the receiving data or not. Herein, the decision is made in accordance with the error detection method such as CRC (an abbreviation for "Cyclic Redundancy Check").

The receiving data transmission control block 124 transmits error detection information of the receiving data to the base station control device 110 via the base station control device data transmission block 126. In addition, when receiving a transmission request of the receiving data given from the base station control device 110 via the base station control device data transmission block 126, the receiving data transmission control block 124 accesses the receiving data buffer block 125 to transmit the receiving data to the base station control device 110 via the base station control device data transmission block 126.

The receiving data buffer block 125 stores the receiving data, which are decoded by the data decoding block 122.

The base station control device data transmission block 126 performs receiving of control information as well as transmission of control information and receiving data with respect to the base station control device 110 connected thereto.

Next, the operation of the mobile communication system of FIG. 1 will be described with reference to FIG. 4.

FIG. 4 is a flowchart showing procedures that the base station control device performs.

Each of the radio base stations that establish site diversity with the mobile station 130 performs decoding of receiving data and error detection. So, the radio base station 120 transmits error detection information and a frame number to the base station control device 110, which is connected thereto. Herein, the frame number corresponds to information that puts signals, transmitted from the mobile station, in order. The frame number is contained as a part of receiving signals. So, the data decoding block 122 decodes the receiving signals to produce the receiving data as well as the frame number.

In step A301, the base station control device 110 obtains error detection information of the receiving data, given from each radio base station regarding the site diversity, together with the frame number.

In step A302, the receiving data selection control unit 112 of the base station control device 110 makes a decision as to whether there exists a radio base station that most firstly reports non-error detection result (i.e., non existence of error) or not with respect to each frame. If such a radio base station exists, the base station control device 110 sends a receiving data transmission request to such a radio base station (see step A303). If not, the base station control device 110 sends a receiving data transmission request to a radio base station providing receiving data, which are considered to contain a smallest amount of error within all of receiving data given from the radio base stations (see step A304).

When receiving the receiving data transmission request from the base station control device 110, the radio base station 120 transmits receiving data to the base station control device 110.

So, in step A305, the base station control device 110 obtains the receiving data from the radio base station 120. Then, the base station control device 110 transfers the receiving data to the mobile communication exchange 100.

Next, the operation of the mobile communication system of FIG. 1 will be described in a more detailed manner.

Suppose a case that the mobile station 130 establishes site diversity using three radio base stations 120-1, 120-2 and 120-3.

In such a case, for example, each of the three radio base stations 120-1, 120-2 and 120-3 receives a same signal sent from the mobile station 130. Now, suppose a situation where the radio base station 120-1 has no error in receiving data while both of the radio base stations 120-2 and 1203 have error in receiving data, so error detection information is sent to the base station control device 110 from each of the radio base stations in an order of 120-3, 120-2 and 120-1.

Each of the three radio base stations decodes receiving signals, given from the mobile station 130, to produce receiving data and a frame number. Then, it performs error detection of the receiving data. So, each of the radio base stations sends the frame number and error detection information to the base station control device.

In the aforementioned situation, the error detection information given from the radio base station 120-1 is interpreted as "OK" (i.e., no error), while the error detection information given from each of the radio base stations 120-2 and 120-3 is interpreted as "NG" (i.e., error).

At first, the base station control device 110 receives the error detection information from the radio base station 120-3 with respect to a new frame number (see step A301). Because the above error detection information corresponds to "NG", the base station control device 110 waits for receipt of the error detection information given from each of the radio base stations 120-1 and 120-2. Next, the base station control device 110 receives the error detection information from the radio base station 120-2 with respect to the new frame number (see step A301). Because this error detection information also corresponds to "NG", the base station control device 110 waits for receipt of the error detection information given from the remaining radio base station 120-1. Lastly, the base station control device 110 receives the error detection information from the radio base station 120-1 with respect to the new frame number (see step A301). Because this error detection information corresponds to "OK", the base station control device 110 sends a receiving data transmission request to the radio base station 120-1 (see step A303).

Incidentally, it is possible to design the base station control device 110 such that a receiving data abandonment request is sent to the radio base stations 120-2 and 120-3, to which the receiving data transmission request is not sent. In that case, the radio base station receiving the receiving data abandonment request is capable of abandoning receiving data stored in the receiving data buffer block thereof.

The radio base station 120-1 receiving the receiving data transmission request reads receiving data from the receiving data buffer block thereof so as to transmit it, together with its frame number, to the base station control device 110.

Thus, the base station control device 110 sequentially transmits the receiving data, given from the radio base station 120-1, to the mobile communication exchange 100 in accordance with an order of the frame numbers.

Figure 5A:
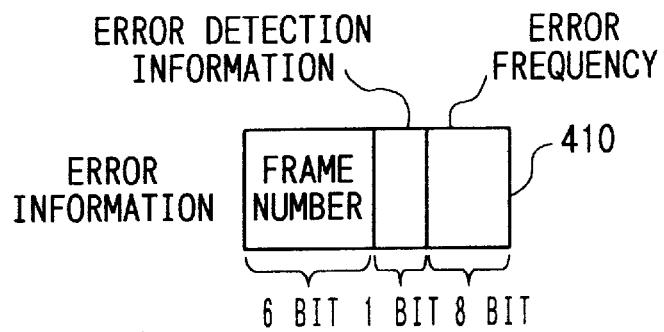
FIG. 5A shows an example of a frame format for error information.
Figure 5B:
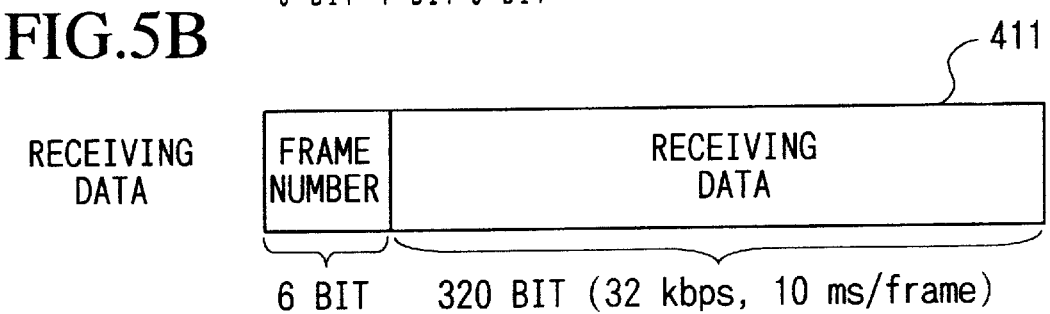
FIG. 5B shows an example of a frame format for receiving data.

FIGS. 5A and 5B show data formats for error information and receiving data, which are transmitted from the radio base station to the base station control device.

The above data formats represent examples regarding amounts of information and data, which are transmitted from the radio base station 120 to the base station control device 110 with respect to one frame in the case where data speed is 32 kilo bits per second while one frame corresponds to 10 ms.

Figure 9:
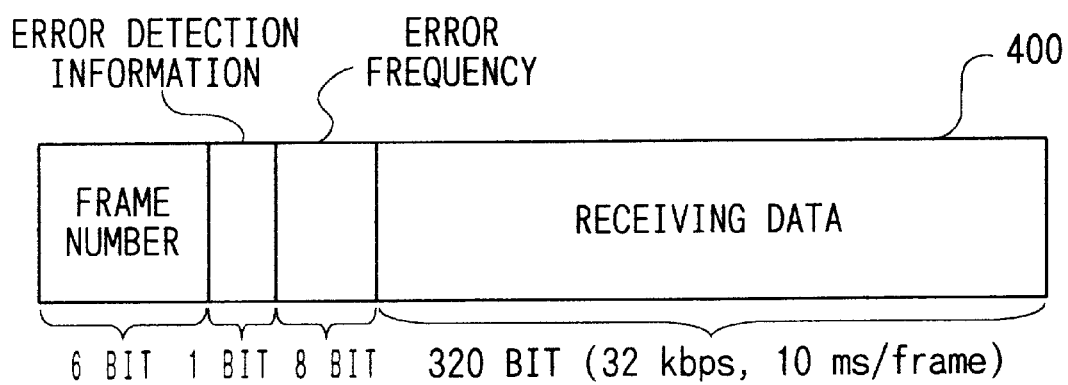
FIG. 9 shows an example of a frame format of information which is transmitted from a radio base station to a base station control device in accordance with the conventional method.

In the case of the site diversity using three radio base stations in accordance with the conventional method, it is necessary to provide three lines of the frame format 400 (see FIG. 9), which is configured by the frame number, error detection information, error frequency and receiving data. In this case, 335 bits are required for one line, so it is necessary to provide transmission of 1,005 bits for three lines.

In the case of the site diversity using three radio base stations in accordance with the present example of this invention, each of the radio base stations transmits error information in a frame format 410, shown in FIG. 5A, which is configured by the frame number, error detection information and error frequency, a total number of bits of which is 15 bits for one line. So, three lines of the frame format 410 is calculated by "(15 bits)×(3 lines)", a result of which is 45 bits. In addition, the present example of the invention allows only one radio base station to transmit receiving data in a frame format 411, shown in FIG. 5B, which is configured by a frame number and receiving data, a total number of bits of which is 326 bits. As a result, the present example of the invention requires transmission of the three lines of the frame format 410 as well as the frame format 411, a total number of bits of which is calculated by "45 bits+326 bits", i.e., 371 bits. As compared with the conventional method which requires transmission of 1,005 bits, the present example of the invention requires transmission of only 371 bits.

That is, as compared with the convention method, the present example of the invention is capable of reducing a use rate of uplink lines while a number of radio base stations used in the site diversity increases in the case of the uplink site diversity.

Incidentally, the present example provides a unit to perform transmission and receiving of control information and receiving data with respect to the base station control device, a unit to perform transmission and receiving of control information and receiving data with respect to the radio base station(s), and a unit to perform transmission of receiving data, corresponding to the transmission request, to the mobile communication exchange. Herein, it is possible to equip the above units with a line switching unit or an ATM switching unit (where "ATM" is an abbreviation for "Asynchronous Transfer Mode"), for example.

Next, a second example of the invention will be described.

Figure 6:
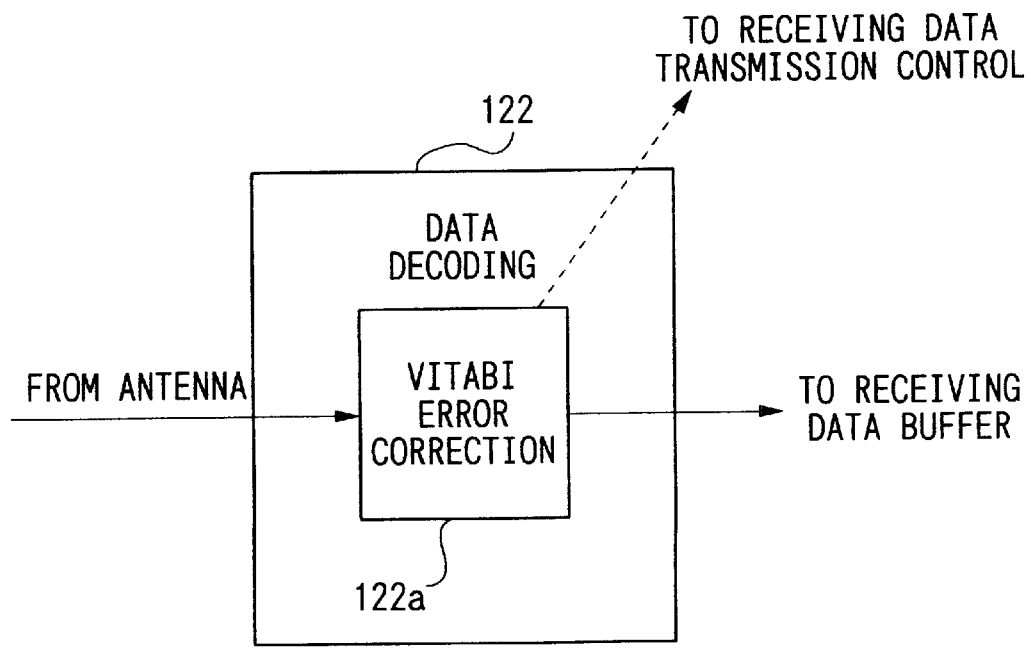
FIG. 6 is a block diagram showing an essential part of a data decoding block of a radio base station in accordance with a second example of the invention.

FIG. 6 shows an essential part of the second example of the invention as compared with the aforementioned first example of the invention, which is shown by FIG. 1, FIG. 2 and FIG. 3.

As compared with the first example, the second example shown in FIG. 6 is characterized by providing a viterbi error correction portion 122a inside of the data decoding block 122 of the radio base station 120 (see FIG. 3).

With reference to FIG. 3 and FIG. 6, a description will be given with respect to a configuration for the decoding process of receiving data using convolution codes, such as the viterbi error correction, which are capable of obtaining an error frequency on the basis of correct data.

The viterbi error correction portion 122a performs viterbi error correction on receiving signals. So, in a process to correct error of the receiving data, it obtains an error frequency (or degree of error) with respect to the receiving data.

Other than the above, the configuration of the second example is identical to that of the first example.

Next, operation of the second example will be described in detail.

With reference to FIG. 1, FIG. 4 and FIG. 6, a description will be given with respect to the operation of the second example in the case where convolution codes, such as the viterbi error correction, that are capable of providing an error frequency on the basis of correct data are used for the decoding process of the receiving data.

Suppose a case where the mobile station 130 establishes site diversity using three radio base stations, wherein all of data received by the radio base stations are incorrect. In such a case, error frequencies of the three radio base stations differ from each other as follows:

Error frequency of the radio base station 120-1 is "50";
Error frequency of the radio base station 120-2 is "100"; and
Error frequency of the radio base station 120-3 is "200".

Each of the radio base stations 120-1 to 120-3 uses viterbi error correction to decode receiving signals from the mobile station 130 so that the receiving data, error frequency and frame number thereof are produced. Through error correction of the receiving data, the radio base station provides the error frequency, frame number and error detection information, which are sent to the base station control device 110.

So, the base station control device 110 receives three sets of the error detection information and error frequency from the radio base stations 120-1 to 120-3 with respect to a new frame number (see step A301). Herein, all of the receiving data correspond to error (see step A302), so the base station control device 110 selects a radio base station whose error frequency is the smallest (or whose amount of error is considered to be the smallest) within the radio base stations 120-1 to 120-3. As described before, the radio base station whose error frequency is the smallest corresponds to the radio base station 120-1 whose error frequency is "50". So, the base station control device 110 sends a receiving data transmission request to the radio base station 120-1 (see step A304).

In the above, it is possible to design the base station control device 110 such that a receiving data abandonment request is sent to each of the radio base stations 120-2 and 120-3, to which the base station control device 110 does not send a receiving data transmission request. So, the radio base station receiving the receiving data abandonment request is capable of abandoning receiving data stored in the receiving data buffer block thereof.

The radio base station 120-1 receiving the receiving data transmission request reads receiving data from the receiving data buffer block thereof, so the receiving data together with its frame number are sent to the base station control device 110.

Thus, the base station control device 110 sequentially send the receiving data, given from the radio base station 120-1, to the mobile communication exchange 100 in accordance with an order of the frame numbers.

Next, a third example of the invention will be described.

Figure 7:
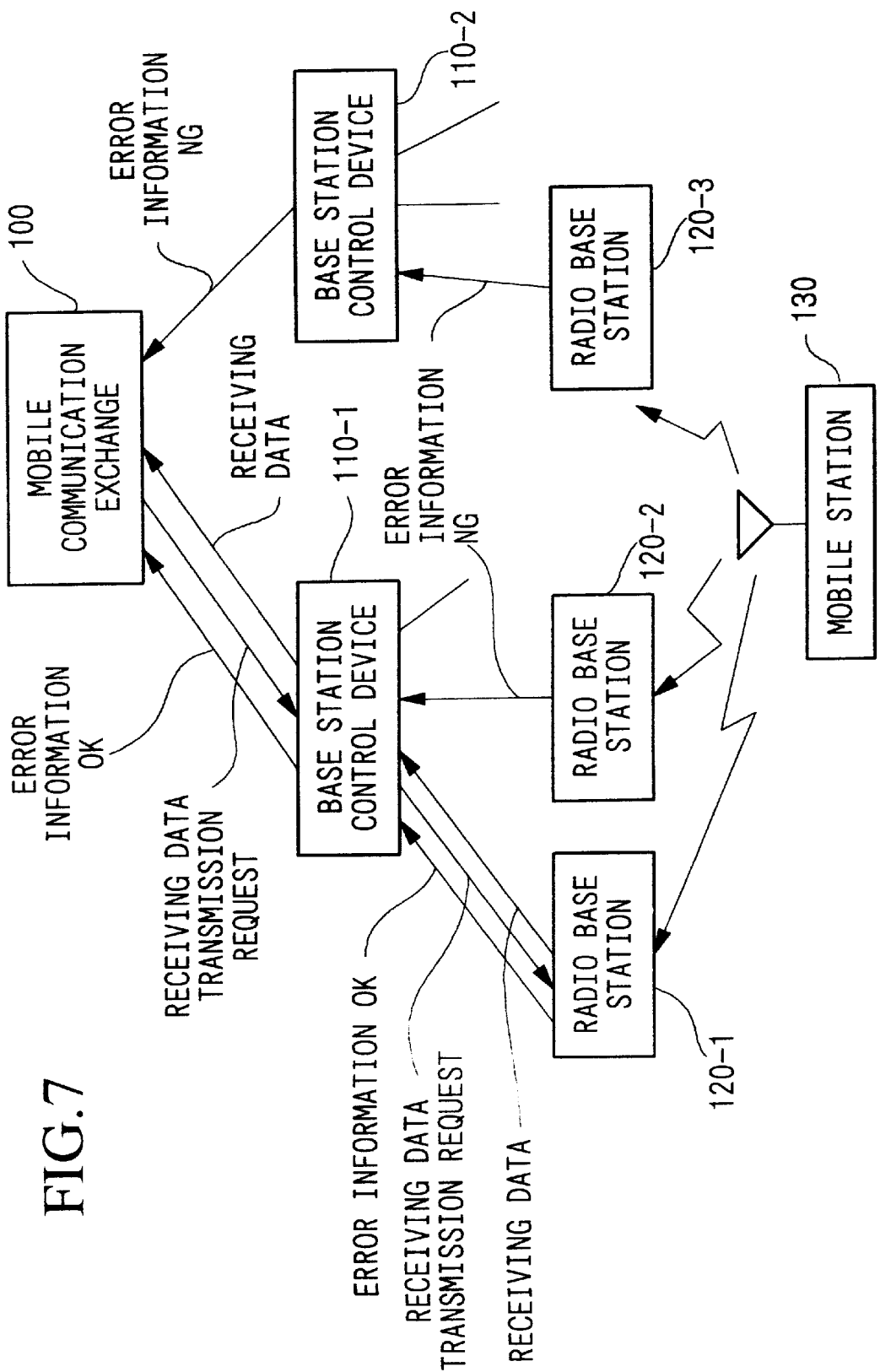
FIG. 7 shows a system configuration of a mobile communication system in accordance with a third example of the invention.
Figure 8:
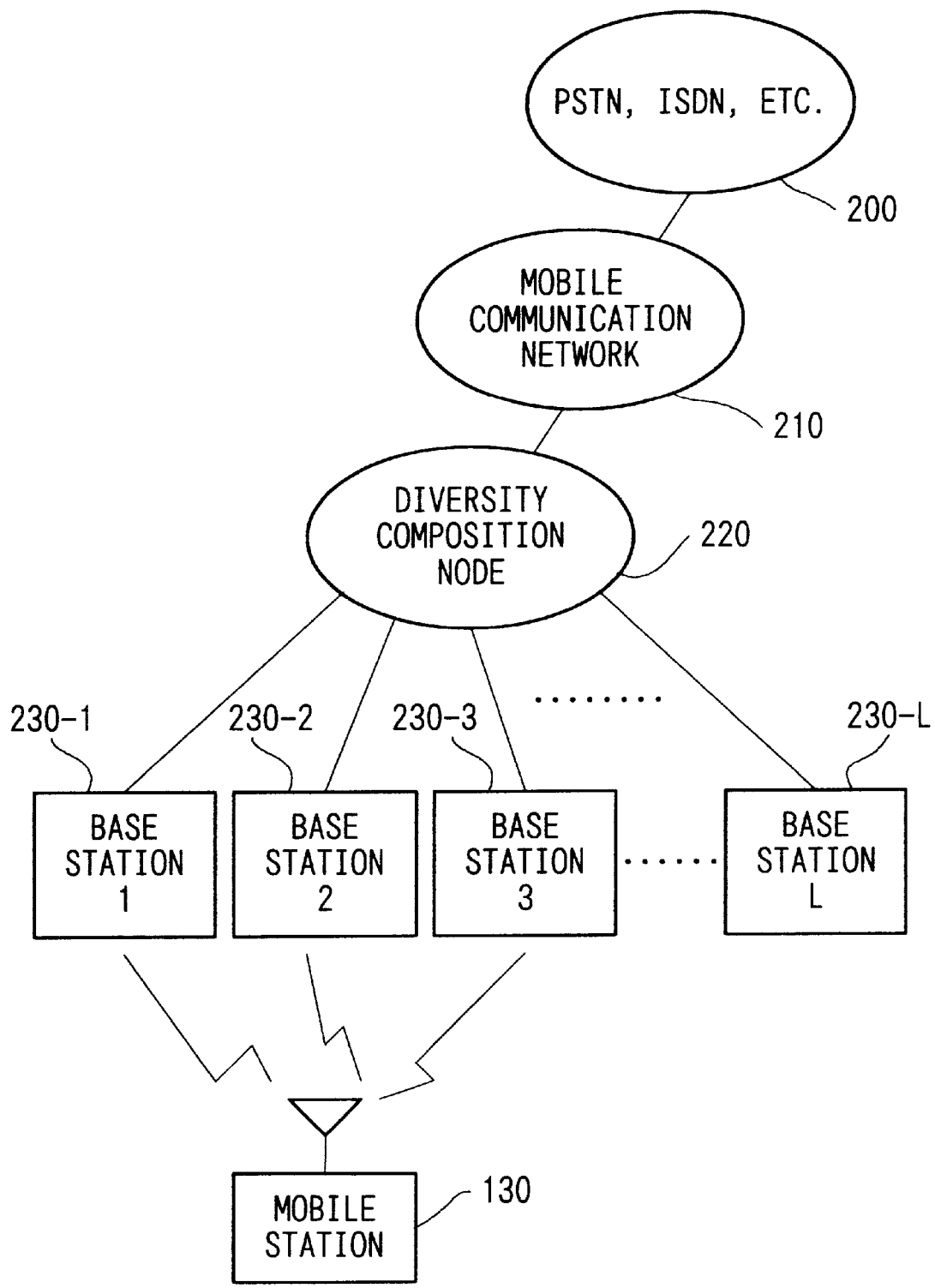
FIG. 8 shows an example of a system configuration of a mobile communication system that is established in accordance with the conventional site diversity receiving method.

FIG. 7 shows a system configuration of a mobile communication system in accordance with a third example of the invention, wherein parts equivalent to those of FIG. 1 will be designated by the same reference symbols.

Now, a description will be given with respect to a system configuration that performs site diversity by means of the mobile communication exchange 100 with reference to FIG. 7.

In FIG. 7, the mobile station 130 establishes site diversity using three radio base stations 120-1 to 120-3, wherein the base station control device 110 deals with communications with the radio base stations 120-1 and 120-2 while the base station control device 110-2 deals with communications with the radio base station 120-3.

Thus, the base station control device 110-1 transfers error information and receiving data, given from each of the radio base stations 120-1 and 120-2, to the mobile communication exchange 100, while the base station control device 110-2 transfers error information and receiving data, given from the radio base station 120-3, to the mobile communication exchange 100.

Next, operation of the third example of the invention will be described in detail.

With reference to FIG. 7, a description will be given with respect to the operation regarding the site diversity by means of the mobile communication exchange 100.

There are provided two methods to obtain receiving data.

According to a first method, a set of error information and receiving data, given from one base station control device, are transferred to another base station control device by means of the mobile communication exchange 100.

According to a second method, three sets of the error information, respectively given from the radio base stations 120-1, 120-2 and 120-3 which are used to establish the site diversity, are transferred to the mobile communication exchange 100 via the base station control devices 110-1 and 110-2. Based on the error information, the mobile communication exchange 100 selects a radio base station whose receiving data have no error or a radio base station whose amount of error is small within the radio base stations 120-1, 120-2 and 120-3. Thus, the mobile communication exchange 100 sends a receiving data transmission request to the selected radio base station.

Lastly, an effect of this invention can be summarized as follows:

At an uplink site diversity mode, this invention is capable of reducing a number of lines, which are required between the radio base station(s) and base station control device(s). That is, as compared with the conventional method that requires a number of lines which corresponds to a number of base stations regarding the site diversity, this invention requires only one line. Such an effect can be obtained with regard to the line switching and ATM switching as well.

Because, this invention is designed in such a way that only a radio base station whose quality in receiving data is the best within radio base stations receiving signals from the mobile station is allowed to transmit the receiving data thereof to the base station control device.

As this invention may be embodied in several forms without departing from the spirit of essential characteristics thereof, the present examples of this invention are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A radio base station receiving data transmission system for uplink site diversity of a mobile communication system comprising:

a mobile station;

a plurality of radio base stations used for site diversity, wherein each of the plurality of radio base stations is capable of receiving signals communicated from the mobile station so as to provide receiving data;

a base station control device for controlling communications of the plurality of radio base stations; and a mobile communication exchange which receives the receiving data of the radio base station and transmits the receiving data to a desired network, wherein the radio base station comprises:

receiving means for receiving the signals from the mobile station;

decoding means for decoding the signals to produce the receiving data;

detection means for detecting errors in the receiving data to produce error information;

transmission control means for controlling transmission of the receiving data to the base station control device;

storing means for storing the receiving data to be transmitted to the base station control device; and first means for transmitting or receiving control information and the receiving data with respect to the base station control device, and wherein the base station control device comprises second means for transmitting or receiving the control information and the receiving data with respect to the radio base station;

transmission request means for requesting the radio base station to transmit the receiving data thereto on the basis of the error information; and transmission means for transmitting the receiving data, transmitted thereto from the radio base station, to the mobile communication exchange, wherein the decoding means comprises error frequency obtaining means to obtain an error frequency based on correct data using convolution codes.

2. A radio base station receiving data transmission system as defined in claim 1 wherein the transmission request means requests transmission of receiving data of a radio base station, which reports a non-error detection result firstly within the plurality of radio base station s with respect to a frame that the mobile station transmits.

3. A radio base station receiving data transmission system as defined in claim 1 wherein the transmission request means requests transmission of receiving data of a radio base station whose error frequency is the smallest within the plurality of radio base stations in the case where all sets of error detection information, contained in the error information, represent occurrence of error in all receiving data of the plurality of radio base stations.

4. A radio base station receiving data transmission system as defined in claim 1 wherein each of the first means for transmitting or receiving the control information and the receiving data with respect to the base station control means, the second means for transmitting or receiving the control information and the receiving data with respect to the radio base station, and the transmission means for transmitting the receiving data, for which the transmission request is issued, to the mobile communication exchange provides a line switching means.

5. A radio base station receiving data transmission system as defined in claim 1 wherein each of the first means for transmitting or receiving the control information and the receiving data with respect to the base station control means, the second means for transmitting or receiving the control information and the receiving data with respect to the radio base station, and the transmission means for transmitting the receiving data, for which the transmission request is issued, to the mobile communication exchange provides an ATM switching means.

6. A radio base station receiving data transmission system as defined in claim 1 wherein there are provided first and second base station control devices that control radio base stations respectively, and wherein the transmission request means of the first base station control device requests a radio base station to transmit its receiving data thereto on the basis of its error information, while the transmission request means of the second base station control device requests another radio base station to transmit its receiving data thereto on the basis of its error information.

7. A radio base station receiving data transmission system as defined in claim 1 wherein the mobile communication exchange provides a transmission request means for requesting each of the radio base stations, which is connected to the base station control device on the basis of the error information, to transmit its receiving data.

8. A radio base station receiving data transmission system for uplink site diversity that a mobile station establishes using a plurality of radio base stations under control of a base station control device with respect to a mobile communication exchange, said radio base station receiving data transmission system comprising:

error detection means for detecting an error frequency using convolutional codes contained in a frame of receiving data corresponding to receiving signals transmitted from the mobile station to each of the radio base stations, to produce error information;

selection means for selecting one of the radio base stations, which has a smallest error frequency, on the basis of the error information, which is transmitted from each of the radio base stations that are connected to the mobile station to the base station control device; and transmission request means for requesting the selected radio base station to transmit its receiving data to the base station control device, so that the receiving data are further transmitted to the mobile communication exchange.

9. A radio base station receiving data transmission system as defined in claim 8 wherein the error information and the receiving data are provided with respect frames transmitted by said mobile stations.

10. A radio base station receiving data transmission system as defined in claim 8 wherein the error information contains error detection information representing occurrence of errors in the receiving data and an error frequency representing a degree of error in the receiving data.

11. A radio base station receiving data transmission method for uplink site diversity that a mobile station establishes using a plurality of radio base stations under control of a base station control device with respect to a mobile communication exchange, said radio base station receiving data transmission method comprising the steps of:

detecting an error frequency in receiving data using convolutional codes to produce error information with respect to each of the radio base stations;

obtaining the error information with respect to receiving data of each of the radio base stations;

making a decision as to whether there exists a radio base station that firstly reports a non-error detection result, based on the error information, within the radio base stations with respect to each frame received from said mobile station; and requesting transmission of receiving data to the base station control device with respect to a radio base station corresponding to the non-error detection result.

12. A radio base station receiving data transmission method as defined in claim 11 further comprising the step of:

if a decision is made that there does not exist the radio base station that firstly reports the non-error detection result with respect to each frame, selecting a radio base station whose amount of error in receiving data is the smallest within the radio base stations, so that the transmission of receiving data is requested with respect to the selected radio base station.

\* \* \* \* \*